USOO5883183A

United States Patent [19]
Kitamura et al.

[11] Patent Number: 5,883,183
[45] Date of Patent: Mar. 16, 1999

[54] REDUCED HYSTERESIS PRODUCTS PREPARED WITH ANIONIC POLYMERIZATION INITIATORS

[75] Inventors: Takashi Kitamura, Akron; David F. Lawson, Uniontown, both of Ohio; Koichi Morita; Yoichi Ozawa, both of Tokyo, Japan

[73] Assignee: Bridgestone Corporation, Tokyo, Japan

[21] Appl. No.: 467,363

[22] Filed: Jun. 6, 1995

Related U.S. Application Data

[60] Division of Ser. No. 359,261, Dec. 19, 1994, Pat. No. 5,674,798, which is a continuation-in-part of Ser. No. 962,373, Oct. 16, 1992, Pat. No. 5,393,721.

[51] Int. Cl.$^6$ ............................... C08K 3/04; C08F 8/42; C08F 36/04
[52] U.S. Cl. ........................... 524/575; 524/571; 524/572; 524/577; 525/105; 525/106; 525/332.3; 525/342; 525/370; 525/371; 526/174; 526/180; 526/204; 526/217; 526/335; 526/340; 526/346; 152/209 RR; 152/450; 152/525
[58] Field of Search ..................................... 526/340, 335, 526/180, 346, 174; 524/571, 572, 575, 577; 525/105, 106, 371, 332.3, 342, 370; 152/209 RR, 450, 525

[56] References Cited

U.S. PATENT DOCUMENTS

| | | | |
|---|---|---|---|
| 2,849,432 | 8/1958 | Kibler et al. ............................ | 260/94.2 |
| 3,109,871 | 11/1963 | Zalinski et al. ........................ | 260/85.1 |
| 3,177,190 | 4/1965 | Hsieh .................................... | 260/94.2 |
| 3,178,398 | 4/1965 | Strobel et al. .......................... | 260/85.1 |
| 3,240,772 | 3/1966 | Natta et al. ............................. | 260/88.7 |
| 3,290,277 | 12/1966 | Anderson et al. ..................... | 260/88.2 |
| 3,317,918 | 5/1967 | Foster .................................... | 260/83.7 |
| 3,326,881 | 6/1967 | Uraneck et al. ........................ | 260/94.6 |
| 3,331,821 | 7/1967 | Strobel .................................. | 260/83.7 |
| 3,393,182 | 7/1968 | Trepka .................................. | 260/79.5 |
| 3,426,006 | 2/1969 | Nützel et al. .......................... | 260/83.5 |
| 3,439,049 | 4/1969 | Trepka .................................... | 260/624 |
| 3,856,877 | 12/1974 | Otsuki et al. ....................... | 260/677 R |
| 3,935,177 | 1/1976 | Muller et al. .......................... | 260/84.7 |
| 4,015,061 | 3/1977 | Schulz et al. ............................ | 526/178 |
| 4,026,865 | 5/1977 | Uraneck et al. ..................... | 260/42.32 |
| 4,085,265 | 4/1978 | Otsuki et al. ............................. | 526/49 |

(List continued on next page.)

FOREIGN PATENT DOCUMENTS

| | | |
|---|---|---|
| 0 067 111 A2 | 5/1982 | European Pat. Off. . |
| 0 180 141 A1 | 10/1985 | European Pat. Off. . |
| 0 207 565 A1 | 6/1986 | European Pat. Off. . |
| 0 264 506 A1 | 10/1986 | European Pat. Off. . |
| 0 282 437 A2 | 3/1988 | European Pat. Off. . |
| 0 290 883 A1 | 4/1988 | European Pat. Off. . |
| 0 316 255 A2 | 10/1988 | European Pat. Off. . |
| 0 423 087 A2 | 5/1990 | European Pat. Off. . |
| 0 451 603 A2 | 3/1991 | European Pat. Off. . |
| 2 250 774 | 11/1974 | France . |
| 2 447 938 | 1/1980 | France . |
| 138 070 | 10/1979 | Germany . |
| 247455 | 3/1986 | Germany . |
| 54-65788 | 11/1977 | Japan . |
| 54-22484 | 2/1979 | Japan . |
| 59-164308 | 9/1984 | Japan . |
| 2 117 778 | 3/1983 | United Kingdom . |

OTHER PUBLICATIONS

Henderson, Styrene–Butadiene Rubber, Rubber Technology (1987) Van Nostrand Reinhold, N.Y., 228–233.
English language translation of Japanese Kokai 54–65788, published May 26, 1979.
"3–Dimethylaminopropyl–Lithium—An Analytical and Kinetic Investigation of a New Initiator System for Polymer Synthesis" by Eisenbach et al., *European Patent Journal*, vol. 11, pp. 699–704 (1975).
"A Bifunctional Anionic Initiator Soluble in Non–polar Solvents" by Beinert et al., *Makromol. Chem 179*, pp. 551–555 (1978).
"An improved synthesis of p–dimethylaminophenyllithium" by Hallas et al., *Chemistry and Industry*, p. 620 (1969).
"Anionic Polymerization. VII Polymerization and Copolymerization with Lithium Nitrogen–Bonded Initiator" by Cheng, *American Chemical Society*, pp. 513–528 (1981).
"Anionic Polymerization Initiators Containing Protected Functional Groups and Functionally Terminated Diene Polymers" by Schulz et al., *Journal of Polymer Science: Polymer Chemistry Edition*, vol. 12, pp. 153–166 (1974).
"Anionic Polymerization Initiated by Diethylamide in Organic Solvents. I. The Use of Lithium Diethylamide as a Polymerization Catalyst and the Effect of Solvent Type on the Polymerization of Isoprene and Styrene" by Angood et al., *Journal of Polymer Science: Polymer Chemisty Edition*, vol. 11, pp. 2777–2791 (1973).
"Anionic Polymerization Initiators Containing Protected Functional Groups. II." by Schulz et al., *Journal of Polymer Science: Polymer Chemistry Edition*, vol. 15, pp. 2401–2410 (1977).
"Bifunctional anionic intiators: A critical study and overview" by Bandermann et al., *Makromol. Chem 186*, pp. 2017–2024 (1985).

(List continued on next page.)

*Primary Examiner*—Fred Teskin
*Attorney, Agent, or Firm*—Daniel N. Hall

[57] ABSTRACT

The present invention is directed toward anionic polymerization employing lithio amines mixed with an organic alkali metal compound and optionally, a chelating reagent. The lithio amines have the general formula (A)Li(SOL)y, where SOL is a solubilizing component, A is an alkyl, dialkyl, cycloalkyl or dicycloalkyl amine radical or a cyclic amine, and y is 0 or is from about 0.5 to about 3. The invention is also directed toward polymers and other products made using the initiator, and methods therefor. Further, the invention contemplates a polymer, a polymer composition and products therefrom, which include a functional group from the reaction product of an amine and an organolithium compound. The resulting polymers may be terminated with a terminating, coupling or linking agent, which may provide the polymer with a multifunctionality.

24 Claims, No Drawings

U.S. PATENT DOCUMENTS

| | | | |
|---|---|---|---|
| 4,230,841 | 10/1980 | Prudence | 526/179 |
| 4,247,418 | 1/1981 | Halasa et al. | 252/431 N |
| 4,316,001 | 2/1982 | Boileau et al. | 528/14 |
| 4,383,085 | 5/1983 | Fujimaki et al. | |
| 4,414,372 | 11/1983 | Farnham et al. | 526/190 |
| 4,429,091 | 1/1984 | Hall | 526/181 |
| 4,476,240 | 10/1984 | Hall et al. | 502/155 |
| 4,478,953 | 10/1984 | Yuki et al. | 502/155 |
| 4,515,922 | 5/1985 | Sakakibara et al. | 525/99 |
| 4,614,771 | 9/1986 | Watanabe et al. | 525/351 |
| 4,616,069 | 10/1986 | Watanabe et al. | 525/370 |
| 4,647,634 | 3/1987 | Jalics | 526/174 |
| 4,677,153 | 6/1987 | Kitahara et al. | 524/552 |
| 4,734,461 | 3/1988 | Roggero et al. | 525/293 |
| 4,735,994 | 4/1988 | Rogger et al. | 525/279 |
| 4,736,003 | 4/1988 | Schneider et al. | 526/190 |
| 4,791,174 | 12/1988 | Bronstert et al. | 525/274 |
| 4,816,520 | 3/1989 | Bronstert | 525/285 |
| 4,835,209 | 5/1989 | Kitagawa et al. | 524/507 |
| 4,843,120 | 6/1989 | Halasa et al. | 525/53 |
| 4,894,409 | 1/1990 | Shimada et al. | 524/492 |
| 4,914,147 | 4/1990 | Mouri et al. | 524/495 |
| 4,931,376 | 6/1990 | Ikematsu et al. | 526/164 |
| 4,935,471 | 6/1990 | Halasa et al. | 525/359.1 |
| 4,978,754 | 12/1990 | Ibi et al. | 544/176 |
| 5,066,729 | 11/1991 | Stayer, Jr. et al. | 525/315 |
| 5,112,929 | 5/1992 | Hall | 526/181 |
| 5,115,035 | 5/1992 | Shiraki et al. | 525/314 |
| 5,149,457 | 9/1992 | Smith | 252/182.12 |
| 5,153,159 | 10/1992 | Antkowiak et al. | 502/155 |
| 5,196,138 | 3/1993 | Smith, Jr. | 252/182.12 |
| 5,238,893 | 8/1993 | Hergenrother et al. | 502/155 |
| 5,292,790 | 3/1994 | Shimizu et al. | 524/496 |
| 5,332,810 | 7/1994 | Lawson et al. | 540/450 |
| 5,393,721 | 2/1995 | Kitamura et al. | 502/154 |
| 5,523,364 | 6/1996 | Engel et al. | 526/180 |
| 5,527,753 | 6/1996 | Engel et al. | 502/155 |
| 5,550,203 | 8/1996 | Engel et al. | 526/336 |
| 5,605,872 | 2/1997 | Engel et al. | 502/157 |

OTHER PUBLICATIONS

"Butadiene–Styrene Copolymerization Initiated by n–BuLi/THF/t–AmOK", by Lehong et al., *Journal of Applied Polymer Science*, vol. 44, pp. 1499–1505 (1992).

"6001 Chemical Abstracts", vol. 91, p. 59 (1979).

"Copolymerization of Butadiene and Styrene by Initiation with Alkyllithium and Alkai Metal tert–Butoxides" by Wofford et al., *Journal of Polymer Science: Part A–1*, vol. 7, pp. 461–469 (1969).

"Lithium Amide Catalyzed Amine–Olefin Addition Reactions" by Schlott et al., *J. Org. Chem.*, vol. 37, No. 26, pp. 4243–4245 (1972).

"New perfectly difunctional organolithium initiators for block copolymer synthesis: Synthesis of dilithium initiators in the absence of polar additives", by Guyot et al., *Polymer*, vol. 22 (1981).

"Polymerization of Unsaturated Compounds in the Presence of Lithium Diethylamide" by Vinogradov et al., *Polymer Science U.S.S.R.*, vol. 4, pp. 1568–1572 (1963).

"Ortho Lithiation via a Carbonyl Synthon" by Harris et al., *J. Org. Chem.*, vol. 44, No. 12, pp. 2004 & 2006 (1979).

"Preparation and Reactions of Trialkyltinlithium" by Tamborski et al., pp. 237–239, Jan. 1963.

"Preparation of Some Trialkyltin–lithium Compounds" by Gilman et al., *J. Am. Chem. Soc. 75*, pp. 2507–2509 (1953).

"Some Reactions of Tributyl– and Triphenyl–stannyl Derivatives of Alkali Metals" by Blake et al., *J. Chem. Soc.*, pp. 618–622, (1961).

"Specific Functionalization of Polymers by Carboxyl Groups" by Broze et al., *Makromol. Chem. 179*, pp. 1383–1386 (1978).

"Stereospecific Addition Reaction Between Butadiene and Amines" by Imai et al., *Tetrahedron Letters No. 38*, pp. 3317–3520 (1971).

"Studies of the Anionic Polymerization of Phenyl Vinyl Sulfoxide and Its Copolymer with Styrene" by Kanga et al. *Macromolecules 23*, pp. 4235–4240 (1990).

"Synthesis of New Monomers by Addition Reactions of Diethylamine to 1,4–Divinylbenzene Catalyzed by Lithium Diethylamide" by Tsuruta et al., *Makromol. Chem. 177*, pp. 3255–3263 (1976).

"The Microstructure of Butadiene and Styrene Copolymers Sythesized with n–BuLi/THF/t–AmOK" by Lehong et al., *Journal of Applied Polymer Science*, vol. 44, pp. 1507–1511 (1992).

"Thermal Elimination of Poly(phenyl vinyl sulfoxide) and Its Polystyrene Block Copolymers" by Kanga et al., *Macromolecules 23*, pp. 4241–4246 (1990).

"Metalations of Benzyldimethylamine and Related Amines with n–Butyllithium in Ether. Deuteration to Form Ring and Side–chain Derivatives" by Jones et al., *J. Org. Chem. 23*, 663 (Mar. 1963) pp. 663–665.

One page translation of Japanese Abstract, Japanese Patent Application 87–180892/26.

One page Derwent Abstract of Japanese Patent JP54065788.

"Asymmetric Deprotonation: A New Route to Chiral Compounds" by Niegel S. Simpkins, *Journal of the Chemical Society, Chemical Communications*, pp. 88–90, 1986.

"$[H_2C(CH_2)_5NLi]_6$, die erste cyclisierte Lithiumamid–Leiter: Synthese und Struktur von Hexamethylenimidolithium" by D. Barr et al., *Angewandte Chemie*, vol. 101, No. 9, pp. 1279–1280, 1989 (in German).

One page Derwent Abstract of Japanese Patent 54022484.

REDUCED HYSTERESIS PRODUCTS PREPARED WITH ANIONIC POLYMERIZATION INITIATORS

RELATED APPLICATION

This application is a division of application Ser. No. 08/359,261, filed Dec. 19, 1994, which is now U.S. Pat. No. 5,674,798 and which is a continuation-in-part of application Ser. No. 07/962,373 filed Oct. 16, 1992, now U.S. Pat. No. 5,393,721.

TECHNICAL FIELD

The subject invention relates to anionic polymerization resulting in diene polymer and copolymer elastomers. More particularly, the present invention relates to polymerization employing a lithio amine initiator, an organic alkali metal compound and optionally, a chelating reagent. The resulting polymers are chain-end modified and contain a high amount of styrene and a low amount of vinyl units.

BACKGROUND ART

When conducting polymerizations on a commercial basis, it is important to utilize process conditions and components which will allow the molecular weight of the end products to be narrowly and reproducibly defined. The characteristics of a given polymer and its usefulness, are dependent, among other things, upon its molecular weight. Hence, it is desirable to be able to predict with some certainty the molecular weight of the end product of the polymerization. When the molecular weight is not narrowly definable, nor reproducible on a systematic basis, the process may not be commercially viable.

In the art, it is desirable to produce elastomeric compounds exhibiting reduced hysteresis characteristics. Such elastomers, when compounded to form articles such as tires, power belts and the like, show an increase in rebound, a decrease in rolling resistance and will have less heat build-up when mechanical stresses are applied.

A major source of hysteretic power loss has been established to be due to the section of the polymer chain from the last cross link of the vulcanizate to an end of the polymer chain. This free end cannot be involved in an efficient elastically recoverable process, and as a result, any energy transmitted to this section of the cured sample is lost as heat. This loss of heat energy contributes to hysteretic power loss.

It is difficult to obtain consistent properties, such as a reduction in hysteresis properties, if the polymer cannot be controllably reproduced in a narrow molecular weight range distribution. See, for example, U.S. Pat. No. 4,935,471, in which some polymers are prepared with a heterogeneous mixture of certain metalated secondary amines, including lithium pyrrolidide. Polymers made in this manner have widely variable molecular weights, broad polydispersities, their functional terminations all of which give rise to poorly reproducible hysteresis reduction results.

It is known in the art to employ a lithium amide with an alkali metal compound, such as, for example, as discussed in Japanese Pat. No. 7,965,788. That patent does not disclose the incorporation of a chelating agent in the initiator system as is done in the present invention. Polymerization to form certain rubber compounds such as styrene/butadiene rubber (SBR) with higher styrene content by using only a lithium amide initiator and alkali metal compound randomizers in acyclic alkanes, causes the formation of a heterogeneous polymer cement, which is comprised of a mixture of widely different styrene content molecules. This makes it difficult to achieve the desired molecular weight and to difficult to control styrene sequence distribution. The presence of such cements often interferes with desirable rubber properties in the polymer.

Furthermore, a major drawback with many of these known anionic initiators, is that they are not soluble in hydrocarbon solvents such as hexane or cyclohexane. Polar solvents have heretofore necessarily been employed including the polar organic ethers such as dimethyl or diethyl ether, tetrahydrofuran, tetramethylethylenediamine, or diethylene glycol dimethyl ether (diglyme).

The invention also provides for the incorporation of a functionality from the initiator into the polymer chain, such that two or more of the ends of the resulting polymer molecules are modified. Hysteresis characteristics of the resulting products are effectively reduced, and other physical characteristics are improved. The invention provides for efficient, controllable and reproducible polymerizations, with the preparation of well defined end-products of a relatively narrow molecular weight distribution range. Furthermore, there is provided a means of controlling the sequence distribution of vinyl aromatic monomers, such as styrene, along a polymer backbone, to improve the hysteresis properties, tear strength and wear resistance of the resulting products.

DISCLOSURE OF THE INVENTION

It is therefore, an object of the present invention to provide a hydrocarbon soluble anionic polymerization initiator.

It is an object of one embodiment of the present invention to provide a randomized, high styrene, low vinyl, styrene/butadiene rubber, which includes polymer chains wherein both ends of the chains are modified by being functionalized.

It is a further object of the present invention to provide a method of preparing such an anionic polymerization initiator.

It is still a further object of the invention to provide an initiator which will reproducibly produce a polymer within a narrow, predictable molecular weight range.

It is another object of the present invention to provide elastomers formed with such a polymerization initiator.

It is also an object of certain embodiments of the present invention to provide diene polymers and copolymers having improved, that is, reduced hysteresis loss characteristics.

It is a further object of the present invention to provide vulcanizable elastomeric compounds.

Still another object of the present invention is to provide an improved tire formed from an elastomer as above.

An additional object of the invention is to provide randomized, high styrene, low vinyl, styrene/butadiene rubber.

These and other objects together with the advantages thereof over the existing art, which shall become apparent from the specification which follows, are accomplished by the invention as hereinafter described and claimed.

In general, the present invention provides a hydrocarbon soluble, anionic polymerization initiator comprising a mixture of (i) a lithio amine having the general formula (A)Li(SOL)y where y is 0 or from about 0.5 to about 3; SOL is a solubilizing component selected from the group consisting of hydrocarbons, ethers, amines or mixtures thereof; and, A is selected from the group consisting of alkyl, dialkyl, cycloalkyl or dicycloalkyl amine radicals having the general formula

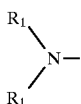

and cyclic amine radicals having the general formula

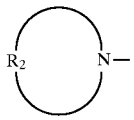

Each $R_1$ is independently selected from the group consisting of alkyls, cycloalkyls and aralkyls having from 1 to about 12 carbon atoms, and $R_2$ is selected from the group consisting of a divalent alkylene, bicycloalkane, substituted alkylene, oxy- or N-alkylamino-alkylene group having from about 3 to about 16 methylene groups. The mixture also comprises (ii) an organic alkali metal compound; and optionally, (iii) a chelating reagent.

There is also provided a method of preparing an anionic polymerization initiator comprising the step of forming a reaction product by reacting an organolithium compound with a functionalizing agent; the functionalizing agent being selected from the group consisting of alkyl, dialkyl, cycloalkyl or dicycloalkyl amine compounds having the general formula

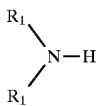

and cyclic amine compounds having the general formula

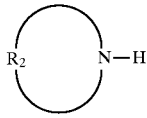

where $R_1$ and $R_2$ are as defined hereinabove. The method also includes mixing the above reaction product with an organic alkali metal compound; and optionally, a chelating reagent. The organolithium compound has the general formula RLi where R is selected from the group consisting of alkyls, cycloalkyls, alkenyls, aryls and aralkyls having from 1 to about 20 carbon atoms and short chain length low molecular weight polymers from diolefin and vinyl aryl monomers having up to about 25 units.

A process for preparing an elastomeric compound having reduced hysteresis properties, is also within the scope of the present invention, and comprises the steps of forming a solution of one or more anionically polymerizable monomers in a hydrocarbon solvent; and polymerizing the monomer with a mixture of a lithio amine and an organic alkali metal compound to form a polymer; wherein the lithio amine has the general formula (A)Li(SOL)y where y is 0 or from about 0.5 to about 3; and, A and SOL are as defined hereinabove.

A polymer according to the invention is prepared by forming a solution of one or more anionically polymerizable monomers in a hydrocarbon solvent; and, polymerizing the monomer with a mixture of a lithio amine and an organic alkali metal compound to form the polymer. The lithio amine has the general formula (A)Li(SOL)y where y, A and SOL are as defined hereinabove.

PREFERRED EMBODIMENTS FOR CARRYING OUT THE INVENTION

As will become apparent from the description which follows, the present invention provides novel polymerization initiators which are soluble in hydrocarbon solvents, such as preferably, cycloalkanes such as cyclohexane, cycloheptane, derivatives thereof and the like, and mixtures of these with alkanes such as hexane, pentane, heptane, octane, their alkylated derivatives, and the like. By soluble, it is understood to mean a solubility of up to about a one molar concentration at room temperature. It has also been discovered herein that certain rubber compositions, vulcanizable elastomeric compositions and articles thereof based upon polymers formed using such initiators, exhibit useful properties, such as for example, reproducible relatively narrow molecular weight ranges. Furthermore, the polymers according to the invention also contain a functionality from the initiator, which functionality is useful for example, in desirably reducing hysteresis loss characteristics. Further still, it has been found that products according to the present invention, when mixed with carbon black, also exhibit improved physical properties, such as high tensile and tear strength and wear resistance properties.

The invention is particularly suited, although it is not necessarily limited to, the production of reduced hysteresis, chain-end modified, high styrene, low vinyl, styrene/butadiene rubber (SBR). When compounded with other ingredients as will be addressed hereinbelow, the resulting elastomer product possesses increased rebound, decreased rolling resistance and/or less heat buildup. Such elastomer products can be used to form improved, energy-efficient tires, power belts and mechanical goods.

The present invention employs a mixture of an amine initiator, an alkaline metal organic randomizer and optionally, a chelating reagent. This mixture is then used as an initiator to cause an ensuing polymerization, as will also be more fully described hereinbelow. Because of the presence of the alkaline metal organic randomizer and optionally, the chelating reagent, the resulting elastomers and other products according to the invention, exhibit not only reduced hysteresis characteristics, but also improved tensile, tear and wear strengths.

A preferred soluble initiator according to the present invention, is one where no solubilizing component is present in the lithio amine compound (that is, the subscript y is zero in the formula hereinbelow). Another preferred initiator according to the invention, is one where SOL is present and the initiator is the reaction product of an amine, an organo lithium and a solubilizing component, SOL. The organo lithium and the amine may be reacted in the presence of the solubilizing component or agent, or they may be reacted first and the reaction product thereof subsequently reacted with the solubilizing component. A preferred initiator is therefore, a solubilized lithio amine having the general formula (A)Li(SOL)y where y is from about 0 to about 3. When SOL is not present, y=0, and when SOL is present it is preferred that y=about 0.5 to about 3. The parentheses of this general formula indicate that the formula may include A—Li—SOLy; SOLy—A—Li; or, A—SOLy—Li.

(SOL) is a solubilizing component and may be a hydrocarbon, ether, amine or a mixture thereof. It has been discovered that by the presence of the (SOL) component, the initiator is soluble in hydrocarbon solvents according to the above definition.

Exemplary (SOL) groups include dienyl or vinyl aromatic polymers or copolymers having a degree of polymerization of from 3 to about 300 polymerization units. Such polymers include polybutadiene, polystyrene, polyisoprene and copolymers thereof. Other examples of (SOL) include polar ligands, such as tetrahydrofuran (THF) and tetramethylethylenediamine (TMEDA).

The (A) component represents the amine functionality, at least one of which is carried by the resulting polymer, such as by being incorporated at the initiation site or head thereof. For example, (A) may be an alkyl, dialkyl, cycloalkyl or a dicycloalkyl amine radical having the general formula

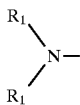

and cyclic amine radicals having the general formula

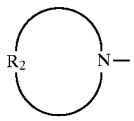

In these formulas, each $R_1$ is an alkyl, cycloalkyl or aralkyl having from 1 to about 20 carbon atoms, where both $R_1$ groups may be the same or different (that is, they are independently selected from that group), and $R_2$ is a divalent alkylene, bicycloalkane, substituted alkylene, oxy- or N-alkylamino-alkylene group having from about 3 to about 16 methylene groups. By "substituted alkylene" it is understood that the alkylene has a substituent thereon. Preferred substituted alkylenes include mono- to octa- substituted alkylenes. The preferred substituents are linear or branched alkyls, cycloalkyls, bicycloalkyls, aryls and aralkyls having from 1 to about 12 carbon atoms.

Exemplary $R_1$ groups include methyl, ethyl, butyl, octyl, cyclohexyl, 3-phenyl-1-propyl, isobutyl and the like. Exemplary $R_2$ groups include trimethylene, tetramethylene, hexamethylene, oxydiethylene, N-alkylazadiethylene and the like.

For example, (A) may be a derivative or radical: of pyrrolidine, that is, $C_4H_8NH$; of piperidine such as for example, piperidine and 3-methylpiperidine; of monoalkyl piperazine such as 4-alkylpiperazine including for example, 4-propylpiperazine; of perhydroazepine such as 3,3,5-trimethylhexahydoazepine and hexamethyleneimine; of 1-azacyclooctane; azacyclotridecane, also known as dodecamethyleneimine; of azacycloheptadecane, also known as hexadecamethyleneimine; of 1-azacycloheptadec-9-ene; or, of 1-azacycloheptadec-8-ene; including bicyclics such as perhydroisoquinoline, perhydroindole, 1,3,3-trimethyl-6-azabicyclo [3.2.1] octane and the like. Pyrrolidine, perhydroazepine, 1-azacyclooctane and azacyclotridecane provide the preferred (A) radicals. A preferred pyrrolidine derivative is of perhydroindole and of piperidine is perhydroisoquinoline. (A) may also be diisobutyl amide or the like.

There are many useful examples of (A) that contain alkyl, cycloalkyl, aryl and aralkyl substituents of the cyclic and bicyclic amines, including, but not limited to 2-(2-ethylhexyl)pyrrolidine; 3-(2-propyl)pyrrolidine; 3,5-bis(2-ethylhexyl)piperidine; 4-phenylpiperidine; 7-decly-1-azacyclotridecane; 3,3-dimethyl-1-azacyclotetradecane; 4-dodecyl-1 -azacyclooctane; 4-(2-phenylbutyl)-1-azacyclooctane; 3-ethyl-5-cyclohexyl-1 -azacycloheptane; 4-hexyl-1-azacycloheptane; 9-isoamyl-1-azacycloheptadecane;2-methyl-1 -azacycloheptadec-9-ene; 3-isobutyl-1-azacyclododecane; 2-methyl-7-t-butyl-1-azacyclododecane; 5-nonyl-1-azacyclodecane; 8-(4'-methylphenyl)-5-pentyl-3-azabicyclo[5.4.0]undecane; 1-butyl-6-azabicyclo[3.2.1]octane; 8-ethyl-3-azabicyclo [3.2.1.]octane; 1-propyl-3-azabicyclo[3.2.2]nonane; 3-(t-butyl)-7-azabicyclo[4.3.0]nonane; 1,5,5-trimethyl-3-azabicyclo[4.4.0]decane; and the like.

It has been found that when $R_1$ and $R_2$ are each branched in the alpha position, such as di-t-butyl, diisopropyl, tertiary butyl or the like, the resulting polymerizations are slow, presumably due to hinderance around the nitrogen at the initiation site. Hence, in a preferred embodiment of the invention, the carbon atoms in $R_1$ and $R_2$ which are bonded to the nitrogen in the amine, are also bonded to a total of at least three hydrogen atoms and thus, are relatively unhindered.

The initiator according to the present invention can be formed by preparing a solution of the functionalizing agent A—H, in an anhydrous, aprotic solvent, such as cyclohexane, preferably in the presence of (SOL), if (SOL) is to be employed and if it is an ether or an amino compound. To this solution is then added an organolithium compound in the same or a similar solvent. The organolithium compound has the general formula RLi where R is selected from the group consisting of alkyls, cycloalkyls, alkenyls, aryls and aralkyls having from 1 to about 20 carbon atoms and short chain length low molecular weight polymers from diolefin and vinyl aryl monomers having up to about 25 units. Typical alkyls include n-butyl, s-butyl, methyl, ethyl, isopropyl and the like. The cycloalkyls include cyclohexyl, menthyl and the like. The alkenyls include allyl, vinyl and the like. The aryl and aralkyl groups include phenyl, benzyl, oligo(styryl) and the like. Exemplary short chain length polymers include the oligo(butadienyls), oligo(isoprenyls), oligo(styryls) and the like, formed by organolithium initiation of oligomerization of the appropriate monomer.

If (SOL) is a short chain length polymer, that is, an oligomer, it can be formed in situ by adding monomer after the amine and the organolithium are mixed, as will be described hereinbelow. The initiator can also be formed by mixing the organolithium and the amine in the presence of the monomer.

To the solution of the amine and the organolithium, if SOL is present, is then added a solution of the monomers of the solubilizing component (SOL) in the same or similar solvent. The components are allowed to react for up to about one hour at ambient temperature (15° to 30° C.), or elevated temperatures up to about 100° C. preferably at less than 50° C., and more preferably at less than 38° C., following which the catalyst is ready for use. The initiators according to the present invention are considered to be soluble if they remain in solution within an excess of a hydrocarbon solvent for about three (3) days, at a concentration of up to about one molar.

The organic alkali metal compound used in the initiator systems of the present invention, is preferably selected from the group consisting of compounds having the general formula $R_3M$, $R_4OM$, $R_5C(O)OM$, $R_6R_7NM$, and $R_8SO_3M$, where $R_3$, $R_4$, $R_5$, $R_6$, $R_7$, and $R_8$ are each selected from the group consisting of alkyls, cycloalkyls, alkenyls, aryls, or phenyls, having from about 1 to about 12 carbon atoms. The metal component M is selected from the group consisting of Na, K, Rb or Cs. Preferably, M is Na or K.

For example, $R_3M$ may include methyl sodium, ethyl potassium, n-propyl rubidium, ethylcesium, t-butyl sodium, t-amylpotassium, n-hexylrubidium, phenyl potassium, benzyl sodium, and the like.

The compound $R_4OM$, may include for example, alkali metal salts of monovalent and polyvalent alcohols, and monovalent and polyvalent phenols, such as sodium (Na), potassium (K), rubidium (Rb) or cesium (Cs) salts of methyl alcohol, ethyl alcohol, n-propyl alcohol, isopropyl alcohol, t-butyl alcohol, t-amyl alcohol, n-hexyl alcohol, cyclohexyl alcohol, t-butenyl alcohol, 4-methylcyclohexyl alcohol, phenol, benzyl alcohol, catechol, resorcinol, 1-naphthol, 2,6di-t-butyl-methylphenol, n-nonylphenol, and the like.

The $R_5C(O)OM$ may include for example, alkali metal salts of mono- and poly-carboxylic acids such as Na, K, Rb and Cs salts of lauric acid, myristic acid, palmitic acid, stearic acid, arachic acid, linoleic acid, phenylacetic acid, benzoic acid, sebacic acid, phthalic acid, and the like.

The compound $R_6R_7NM$ may include for example, alkali metal salts of secondary amine such as Na, K, Rb and Cs salts of dimethylamine, di-n-butylamine, methyl-n-hexylamine, diphenylamine, dibenzylamine, and the like.

The compound $R_8SO_3M$, may include for example, alkali metal salts of sulfonic acids, such as Na, K, Rb and Cs salts of dodecylbenzenesulfonic acid, tetra-decylbenzenesulfonic acid, hexadecylbenzenesulfonic acid, octadecyl-benzenesulfonic acid, and the like.

Suitable polymerization modifiers such as ethers or amines may also be used by combining with alkali metal compounds, to provide the desired microstructure and randomization of the comonomer units.

The initiator mixture according to the invention preferably includes a mixture ratio of the organic alkali metal compound of from about 0.5 to about 0.02 equivalents thereof per equivalent of lithium in the lithio amine initiator.

In the initiator systems of the present invention a chelating reagent can be employed to help prevent heterogeneous polymerization. Useful such reagents include for example, tetramethylethylenediamine (TMEDA), oxolanyl cyclic acetals and cyclic oligomeric oxolanyl alkanes and the like. The oligomeric oxolanyl alkanes may be represented by the structural formula

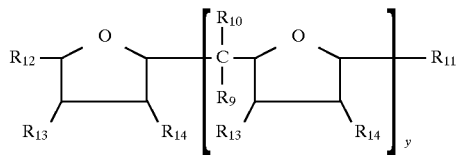

and,

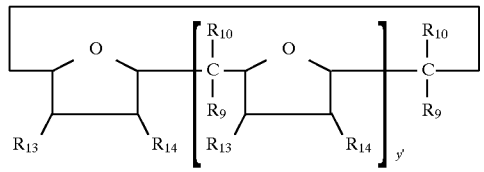

wherein $R_9$ and $R_{10}$ independently are hydrogen or an alkyl group and the total number of carbon atoms in $—CR_9R_{10}—$ ranges between one and nine inclusive; y is an integer of 1 to 5 inclusive; y' is an integer of 3 to 5 inclusive; and $R_{11}$, $R_{12}$, $R_{13}$, and $R_{14}$ independently are —H or $—C_nH_{2n+1}$ wherein n=1 to 6.

The compounds of the first formula are linear oligomers and the modifiers represented by the second structural formula are cyclic oligomers and further details thereof can be found in U.S. Pat. No. 4,429,091, the subject matter of which regarding oligomer oxolanyl alkanes is incorporated herein by reference. Furthermore, details regarding the oxolanyl cyclic acetals can be found in U.S. Pat. No. 5,112,929, and the subject matter of which regarding oligomer oxolanyl alkanes is incorporated herein by reference.

The initiator mixture according to the invention preferably includes a mixture ratio of the chelating reagent of from about 2 to about 0.01 equivalents thereof per equivalent of lithium in the lithio amine initiator. A ratio in the range of about 0.02 to about 0.1 is preferred.

As stated above, the initiator mixture thus formed may be employed as an initiator to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers include conjugated dienes having from about 4 to about 12 carbon atoms and monovinyl aromatic monomers having 8 to 18 carbon atoms and trienes, and mixtures thereof. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, alpha-methylstyrene, p-methylstyrene, vinyltoluene and vinylnapthtalene. The conjugated diene monomer and aromatic vinyl monomer are normally used at the weight ratios of 95–50:5–50, preferably 85–55:15–45. In a particular preferred embodiment the polymer has a high styrene content, that is, a styrene content of about 20 percent by weight or more. It is also preferred that the polymer have a low vinyl content. That is, it is preferred that less than about 50 percent by weight of the butadiene portion is 1,2-units; preferably less than about 40 percent by weight; and more preferred still, less than about 30 percent by weight.

Polymerization is conducted in a hydrocarbon solvent as indicated hereinabove, such as the various hexanes, heptanes, octanes, mixtures thereof, and the like. In order to promote randomization in copolymerization and to control vinyl content, a polar coordinator or other chelating reagents may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed.

Compounds useful as polar coordinators and other chelating reagents are organic, and include, for example, tetrahydrofuran, linear and cyclic oligomeric oxolanyl alkanes such as 2-2'-di(tetrahydrofuryl) propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, the subject matter of which is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); tetrahydrofuran (THF), linear THF oligomers and the like.

A batch polymerization is begun by charging a blend of monomer(s) and hydrocarbon solvent to a suitable reaction vessel, followed by the addition of the polar coordinator (if employed) and the initiator mixture previously described. The reactants are heated to a temperature of from about 20° to about 200° C., and the polymerization is allowed to proceed for from about 0.1 to about 24 hours. A functional amine group is derived from the initiator compound and bonds at the initiation site. Thus, substantially every resulting polymer chain, or the predominance of the chains, has the following general formula AYLi where A is as described above, and Y is a divalent polymer radical which is derived from any or all of the foregoing diene homopolymers, monovinyl aromatic polymers, diene/monovinyl aromatic random copolymers and block copolymers. The monomer addition at the lithium end causes the molecular weight of the polymer to increase as the polymerization continues.

To terminate the polymerization, and thus further control polymer molecular weight and polymer properties, a modifying agent such as a terminating agent, coupling agent or linking agent may be employed, all of these agents being collectively referred to herein as "modifying agents". Certain of these agents may provide the resulting polymer with a multifunctionality. That is, the polymers initiated according to the present invention may carry at one end at least one amine functional group A as discussed hereinabove, and may also carry a second functional group selected and derived from the group consisting of modifying agents at another end.

Useful modifying agents include the following or mixtures thereof: active hydrogen compounds such as alcohol; carbon dioxide; N,N,N',N'-tetradialkyldiaminobenzophenone (such as tetramethyldiaminobenzophenone or the like); N,N-dialkylamino-benzaldehyde (such as dimethylaminobenzaldehyde or the like); 1,3-dialkyl-2-imidazolidinones (such as 1,3-dimethyl-2-imidazolidinone or the like); 1-alkyl substituted pyrrolidinones; 1-aryl substituted pyrrolidinones; dialkyl- and dicycloalkyl-carbodiimides having from about 5 to about 20 carbon atoms; $(R_{15})_a ZX_b$;

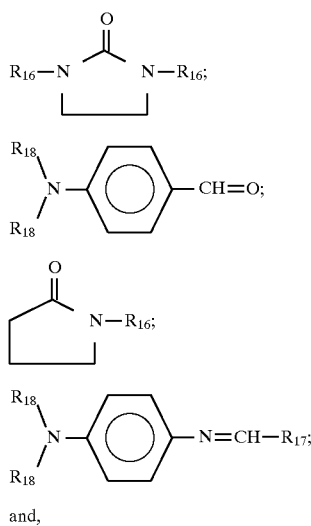

and,

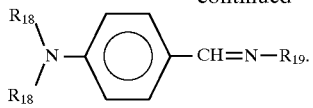

where Z is tin or silicon. In a preferred embodiment Z is tin.

$R_{15}$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_{15}$ may include methyl, ethyl, n-butyl, neophyl, phenyl, cyclohexyl or the like.

X is chlorine, bromine or iodine, "a" is from 0 to 3, "b" is from 1 to 4; and a+b=4.

Each $R_{16}$ is the same or different and is an alkyl, cycloalkyl or aryl, having from about 1 to about 12 carbon atoms. For example, $R_{16}$ may include methyl, ethyl, nonyl, t-butyl, phenyl or the like.

$R_{17}$ is an alkyl, phenyl, alkylphenyl or dialkylaminophenyl, having from about 1 to about 20 carbon atoms. For example, $R_{17}$ may include t-butyl, 2-methyl-4-pentene-2-yl, phenyl, p-tolyl, p-butylphenyl, p-dodecylphenyl, p-diethyl-aminophenyl, p-(pyrrolidino) phenyl, and the like.

Each $R_{18}$ is the same or different, and is an alkyl or cycloalkyl having from about 1 to about 12 carbon atoms. Two of the $R_{18}$ groups may together form a cyclic group. For example, $R_{18}$ may include methyl, ethyl, octyl, tetramethylene, pentamethylene, cyclohexyl or the like.

$R_{19}$ may include alkyl, phenyl, alkylphenyl or dialkylaminophenyl, having from about 1 to about 20 carbon atoms. For example, $R_{19}$ may include methyl, butyl, phenyl, p-butylphenyl, p-nonylphenyl, p-dimethylaminophenyl, p-diethylaminophenyl, p-(piperidino)phenyl, or the like.

Other examples of useful terminating agents include tin tetrachloride, $(R_1)_3SnCl$, $(R_1)_2SnCl_2$, $R_1SnCl_3$, carbodiimides, N-methylpyrrolidinone, cyclic amides, cyclic ureas, isocyanates, Schiff bases, 4,4'-bis (diethylamino) benzophenone, and the like, where $R_1$ is as described hereinabove.

One preferred polymer according to the present invention, is a polymer which includes at least one functional group A as discussed hereinabove, wherein A is derived from the reaction product of an amine and an organolithium compound as also discussed hereinabove. Furthermore, a preferred polymer is multifunctional wherein the polymer also carries a tin-carbon bond, such as may be derived from the terminating, coupling or linking agent. A rubber composition or a vulcanizable rubber composition according to the present invention, may include such a polymer.

The modifying agent is added to the reaction vessel, and the vessel is agitated for about 1 to about 1000 minutes. As a result, an elastomer is produced having an even greater affinity for compounding materials such as carbon black, and hence, even further reduced hysteresis. Additional examples of terminating agents include those found in U.S. Pat. No. 4,616,069 which is herein incorporated by reference for its disclosure regarding terminating agents.

The polymer may be recovered from the solvent by conventional techniques. These include steam or alcohol coagulation, thermal desolventization, or any other suitable method. Additionally, solvent may be removed from the resulting polymer by drum drying, extruder drying, vacuum drying or the like.

The elastomers of the present invention comprise a plurality of polymers, having a functional group at two or more ends of the resulting polymer. Compounds of such polymers may result in products exhibiting reduced hysteresis loss, which means a product having increased rebound, decreased rolling resistance and has less heat build-up when subjected to mechanical stress.

It has also been found, as will be exemplified hereinbelow, that polymers formed using the initiators of the invention, are reproducibly polymerizable in a relatively narrow range of molecular weights, such as that substantially consistently reproducible polymers are possible with a molecular weight range of about 20,000 to about 250,000.

The polymers of the present invention can be used alone or in combination with other elastomers to prepare an elastomer product such as a tire treadstock, sidewall stock or other tire component stock compound. In a tire of the invention, at least one such component is produced from a vulcanizable elastomeric or rubber composition. For example, the polymers according to the invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight. Thus, a tire according to the invention has decreased rolling resistance and at least one structural element such as treads, subtreads, black sidewalls, body ply skims and bead fillers, wherein the structural element results from a vulcanizable elastomer according to the invention.

The polymers can be compounded with carbon black in amounts ranging from about 5 to about 100 parts by weight, per 100 parts of rubber (phr), with about 5 to about 80 parts being preferred and from about 40 to about 70 phr being more preferred. The carbon blacks may include any of the commonly available, commercially-produced carbon blacks but those having a surface area. (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

CARBON BLACKS

| ASTM Designation (D-1765-82a) | Surface Area ($m^2/g$) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination.

Vulcanizable elastomeric or rubber compositions of the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

GENERAL EXPERIMENTAL

In order to demonstrate the preparation and properties of the initiator mixtures and elastomers according to the present invention, a number of such initiator mixtures and elastomers were prepared. A number of solutions of styrene and butadiene monomers in hexane were prepared and were polymerized with the above described initiator mixtures. As noted above, various techniques known in the art for carrying out polymerizations may be employed without departing from the scope of the present invention.

In the following examples, parts and percents are by weight unless otherwise specified. Polymer structure was determined by gel permeation chromatography (GPC) for molecular weight and infrared spectroscopy (IR) for microstructure of diene portion and nuclear magnetic resonance spectrum (NMR) for styrene content.

For evaluation of compounded properties, the strength at breakage was evaluated by using micro-dumbbell specimens. To evaluate hysteresis loss properties, the dynamic loss factor at 50° C. (tan δ) was measured by means of a Dynastat viscoelastomer at 1 Hz. In general, the smaller the tan δ value, the lower the hysteresis loss.

Wear resistance was measured by means of a Lambourn abrasion tester and represented by an index based on the comparative example, as will be discussed hereinbelow. In general, the higher the index number, the better the wear resistance.

EXAMPLE 1

Five pounds of styrene and butadiene blend (total solids in hexane equal to 19%), which had 38% styrene for total monomer, was charged in 1 gallon reactor. To the reactor was then added 0.185 mmol of TMEDA, 0.247 mmol of t-AmyIOK and 3.3 mmol of the N-lithio salt of hexamethyleneimine, or "LHMI". The LHMI was prepared by treating 3.3 mmole of hexamethyleneimine with 3.7 mmole of n-butyllithium in hexanes, immediately prior to charging to the reactor for polymerization. Reaction temperature was set to 150° F. (65° C.). After 80 minutes, a small amount of polymer cement was taken and terminated by i-PrOH. To the rest of the cement was then added 1.8 mmol of $Bu_2SnCl_2$ with agitation for 30 minutes. The polymer cement was coagulated by i-ProH and dried by drum dryer to obtain an SBR, reported hereinbelow as Polymer A. A comparative example polymer was made without TMEDA by using the same method described above. This comparative polymer is reported hereinbelow as Polymer B. Molecular weight information for Polymers A and B are reported in TABLE II hereinbelow.

TABLE II

ANALYSIS OF POLYMERS A AND B

| | Base Polymer | | | Coupled Polymer | | |
|---|---|---|---|---|---|---|
| | $ML_4$ | Mn | Mw/Mn | ML4 | Mn | Mw/Mn | % coupled |
| Polymer A | 35.0 | $1.17 \times 10^5$ | 1.19 | 79.8 | $1.55 \times 10^5$ | 1.67 | 40% |
| Polymer B | 30.0 | $1.04 \times 10^5$ | 1.25 | 75.5 | $1.55 \times 10^5$ | 1.60 | 41% |

This data shows that the use of TMEDA results in a narrower molecular weight distribution as reflected by a lower Mw/Mn ratio.

EXAMPLE 2 - NLiP Initiator and NaOR System a) Bottle polymerization of NLiP.$C_9H_{19}$-φ- ONa System NLiP.2THF was prepared as follows. A mixture of 25.1 meq of pyrrolidine and 25.1 meq of n-butyllithium in hexane was stirred under nitrogen over a weekend at room temperature. This was treated with 50.2 meq of THF in hexane, and the resulting mixture was used to initiate the following polymerization.

A series of bottle polymerizations were carried out using a 35 percent styrene/65 percent butadiene (wt/wt) blend in hexane (18% total solid). In these five polymerizations, the amounts of alkali metal modifier (as sodium nonyl phenoxide) and, in two instances, a chelating agent (a linear oligomeric oxolanyl propane) were varied as shown in the following table:

| | NLiP.2THF/100 g monomer | Na/Li | CA/Li |
|---|---|---|---|
| Bottle C | 1.2 mmol | 1/5 | — |
| Bottle D | 1.2 | 1/10 | — |
| Bottle E | 1.2 | 1/20 | — |
| Bottle F | 1.2 | 1/10 | $CA^1$ = 1/20 |
| Bottle G | 1.2 | 1/20 | $CA^1$ = 1/20 |

[1]"CA" is chelating agent

Each Polymerization reaction was carried out at 50° C. for 4 hours and terminated by addition of isopropyl alcohol ("i-PrOH"). The polymer cement from each bottle C–G, corresponding to Polymers C–G respectively, was a clear yellow solution. The polymers were isolated by coagulation in i-PrOH, treated with an antioxidant (butylated hydroxy toluene) and drum dried. Analysis data for Polymers C–G are listed in TABLE III.

TABLE III

ANALYSIS OF POLYMERS C–G

| Polymer | Conversion | Mn | Mw/Mn | Vinyl[a] | Styrene |
|---|---|---|---|---|---|
| C | 83.1% | $1.2E5^b$ | 1.64 | 37.0% | 34.5% |
| D | 83.0% | 1.1E5 | 1.57 | 29.4% | 34.4% |
| E | 86.4% | 1.1E5 | 1.63 | 25.7% | 34.5% |
| F | 83.0% | 1.1E5 | 1.47 | 40.2% | 34.4% |
| G | 86.0% | 1.1E5 | 1.35 | 43.3% | 34.6% |

[a]Based upon parts of butadiene
[b]"E" means that the number preceding E is muitiplied by 10 raised to the power of the number following E; hence, "1.2E5" is $1.2 \times 10^5$ By adding the chelating reagent, CA, the molecular weight distribution (Mw/Mn) is narrowed as evidenced by the comparison of Polymers C, D and E made without the chelating reagent, against Polymers F and G made with the chelating reagent.

EXAMPLE 3 - NLiP Initiator and t-AmyIOK System a) Reactor polymerization in n-hexane solution 5 pounds of styrene and butadiene monomer blend (total solids in hexane equal to 18%), which has 38 wt % styrene for total monomer, was charged in 1 gallon reactor. To this, 3.9 mmol of NLiP.2THF initiator, prepared as above, was charged along with 0.19 mmol of t-AmyIOK. Reaction temperature was set to 140° F. (60° C.). Polymerization time was 3 hours and observed peak temperature was 155° F. (68° C.). Then, 1.9 mmol of $Bu_2SnCl_2$ solution was added to the reactor as a coupling agent and the reaction mixture was agitated for 30 minutes. Polymer cement was coagulated in i-PrOH, treated with an antioxidant as above, and dried by drum dryer to obtain an SBR, reported herein as a Polymer F.

A comparative example polymer was made by using n-BuLi. Five pounds of 40% styrene and butadiene monomer blend (T.S.=18%) was charged in 1 gallon reactor. To the reactor, 3.8 mmol of n-BuLi and 0.38 mmol of t-AmlyOK was added. After 1.5 hours polymerization at 160° F. (71° C.), 1.9 mmol of $Bu_2SnCl_2$ was charged to the reactor. Then the cement was coagulated and drum dried as above, to obtain Polymer 1.

Characterizations of these polymers are summarized in TABLE IV.

TABLE IV

ANALYSIS OF POLYMERS H AND I

| | Mn | Mw/Mn | ML4 | Vinyl[a] | Styrene |
|---|---|---|---|---|---|
| Polymer H | 1.8E5 | 1.77 | 87 | 22% | 38% |
| Polymer I | 2.0E5 | 1.62 | 94 | 19% | 43% |

[a]Based upon parts of butadiene b) Compound Physical Properties of the Polymer

Polymers H, I and a control, an SBR initiated with BuLi, without the initiator combination of this invention, which was a 20% styrene, 60% vinyl (based upon the butadiene portion), $SnCl_4$ coupled SBR, were tested for physical properties. Compounding was done by using a standard recipe (parts by weight of Polymer 100, HAF carbon black 48.5, aromatic oil 10.5, sulfur 1.5). Results are summarized in TABLE V.

TABLE V

COMPOUNDED PROPERTIES, POLYMERS H–I

|  | Room Temperature | | Wear | tan δ |
|---|---|---|---|---|
|  | $^a$Tb(kg/cm2) | $^b$Eb (%) | Index | 50° C. |
| Example | | | | |
| Polymer H | 256 | 488 | 118 | 0.12 |
| Polymer I | 197 | 420 | 127 | 0.15 |
| Comparative | | | | |
| SBR/SnCl$_4$ | 182 | 430 | 100 | 0.14 |

$^a$tensile strength at break
$^b$elongation percent at break

Polymer H shows lower hysteresis loss and higher tensile strength and wear resistance than comparative polymers.

EXAMPLE 4 - LHMI Initiator and t-AmylOK System a) Reactor Polymerization in n-hexane Solution Five pounds of styrene and butadiene monomer blend (T.S.=18%), which had 28 wt % styrene for total monomer, was charged to a 1 gallon reactor. To this, 3.7 mmol of LHMI initiator was charged, following which 0.18 mmol of t-AmylOK and 1.1 mmol of oligomeric oxolanyl propanes as chelating agent were added. Reaction temperature was set to 160° F. (71° C.). Polymerization time was 1 hour and observed peak temperature was 175° F. (79° C.). Then, 0.9 mmol of SnCl$_4$ solution was added to the reactor and the mixture agitated 30 minutes. The polymer was isolated as in the foregoing examples, and is reported herein as Polymer J.

Polymer K was made by the same procedure as polymer J except using 38 wt % styrene/62 wt % butadiene instead of 28 wt % styrene/72 wt % butadiene monomer blend, and the chelating reagent level was reduced to 0.12 mmol.

Polymer L was made by the same procedure as polymer K except without the chelating reagent.

Characterizations of these polymers are listed in TABLE VI. These polymers were found to have similar glass transition temperatures.

TABLE VI

ANALYSIS OF POLYMERS J–L

|  | Mn | Mw/Mn | ML4 | Vinyl$^a$ | Styrene |
|---|---|---|---|---|---|
| Polymer J | 1.6 × 10$^5$ | 2.05 | 65 | 42% | 28% |
| Polymer K | 1.6 × 10$^5$ | 2.34 | 100 | 22% | 38% |
| Polymer L | 1.6 × 10$^5$ | 2.54 | 118 | 17% | 40% |

$^a$Based upon parts of butadiene b) Compound Physical Properties of the Polymer Polymers J, K, L and a control SBR, consisting of 20% styrene, 60% vinyl (based upon 100% butadiene), SnCl$_4$ coupled SBR, was used for physical characterizations. The polymers were compounded in a natural rubber blended recipe (parts by weight of SBR 75, natural rubber 25, HAF carbon black 48.5, aromatic oil 11, sulfur 1.6). Results are summarized in TABLE VIII.

TABLE VII

|  | 100° C. | | | | |
|---|---|---|---|---|---|
|  | Tb(kg/cm2) | Eb(%) | Tear Strength, 168° C. (kg/cm) | Wear Index | tan δ 50° C. |
| Example Polymer J | 119 | 414 | 30 | 105 | 0.11 |
| Example Polymer K | 127 | 462 | 27 | 116 | 0.12 |
| Example Polymer L | 129 | 473 | 32 | 114 | 0.13 |
| Comparative SBR/SnCl$_4$ | 108 | 417 | 29 | 100 | 0.13 |

These example polymers show higher tensile properties and wear resistance, and also lower hysteresis loss than the control SBR.

It should now be clear from the foregoing examples and specification disclosure, that initiators according to the present invention are useful for the anionic polymerization of diene monomers. Reproducible polymerization of such polymers within a relatively narrow molecular weight range is achieved, and the resulting polymers also exhibit good preservation of live C-Li ends (as shown by efficient coupling), when compared to the non-solubilized initiators (e.g., butyl lithium) heretofore known in the art.

It is to be understood that the invention is not limited to the specific initiator reactants, monomers, terminators, polar coordinators or solvents disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A polymer prepared by forming a solution of one or more anionically polymerizable monomers, selected from the group consisting of conjugated dienes having from about 4 to about 12 carbon atoms, monovinyl aromatic monomers having 8 to 18 carbon atoms, trienes and mixtures thereof, in a hydrocarbon solvent; and, polymerizing said monomers with a mixture of a lithio amine, from about 0.01 to about 2 equivalents per equivalent of lithium of a chelating agent, and an organic alkali metal compound selected from the group consisting of compounds having the formula R$_4$OM, R$_5$C(O)OM, R$_6$R$_7$NM, and R$_8$SO$_3$M, where R$_4$, R$_5$, R$_6$ R$_7$, and R$_8$ are each selected from the group consisting of alkyls, cycloalkyls, alkenyls, aryls, and phenyls, having from 1 to about 12 carbon atoms; and where M is selected from the group consisting of Na, K, Rb and Cs, to form the polymer;

said lithio amine having the formula (A)Li(SOL)y where y is from about 0.5 to about 3; SOL is a solubilizing component selected from the group consisting of hydrocarbons, ethers, amines and mixtures thereof; and, A is selected from the group consisting of alkyl, dialkyl, cycloalkyl and dicycloalkyl amine radicals having the formula

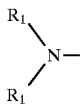

and cyclic amine radicals having the formula

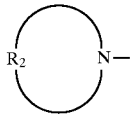

where each $R_1$ is independently selected from the group consisting of alkyls, cycloalkyls and aralkyls having from 1 to about 12 carbon atoms, and $R_2$ is selected from the group consisting of divalent alkylene, bicycloalkane, substituted alkylene, oxy- and N-alkylamino-alkylene group having from about 3 to about 16 methylene groups; and wherein said polymer comprises a Z-carbon bond derived from a terminating, coupling or linking agent $(R_{15})_a ZX_b$, where Z is selected from the group consisting of tin or silicon; $R_{15}$ is selected from the group consisting of alkyls having from 1 to about 20 carbon atoms, cycloalkyls having from about 3 to about 20 carbon atoms, aryls having from about 6 to about 20 carbon atoms and aralkyls having from about 7 to about 20 carbon atoms; X is chlorine or bromine; a is from 0 to 3, b is from 1 to 4, and a+b=4.

2. A rubber composition formed by the steps of:

compounding a polymer with from about 5 to about 80 parts by weight of carbon black, per 100 parts of the polymer; wherein the polymer is prepared by:

forming a solution of one or more anionically polymerizable monomers, selected from the group consisting of conjugated dienes having from about 4 to about 12 carbon atoms, monovinyl aromatic monomers having 8 to 18 carbon atoms, trienes and mixtures thereof, in a hydrocarbon solvent; and, polymerizing said monomers with a mixture of a lithio amine, from about 0.01 to about 2 equivalents per equivalent of lithium of a chelating agent, and an organic alkali metal compound selected from the group consisting of compounds having the formula $R_4OM$, $R_5C(O)OM$, $R_6R_7NM$, and $R_8SO_3M$, where $R_4$, $R_5$, $R_6$ $R_7$, and $R_8$ are each selected from the group consisting of alkyls, cycloalkyls, alkenyls, aryls, and phenyls, having from 1 to about 12 carbon atoms; and where M is selected from the group consisting of Na, K, Rb and Cs, to form the polymer;

said lithio amine having the formula (A)Li(SOL)y where y is from about 0.5 to about 3; SOL is a solubilizing component selected from the group consisting of hydrocarbons, ethers, amines and mixtures thereof; and, A is selected from the group consisting of alkyl, dialkyl, cycloalkyl and dicycloalkyl amine radicals having the formula

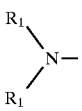

and cyclic amine radicals having the formula

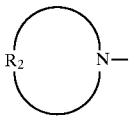

where each $R_1$ is independently selected from the group consisting of alkyls, cycloalkyls and aralkyls having from 1 to about 12 carbon atoms, and $R_2$ is selected from the group consisting of divalent alkylene, bicycloalkane, substituted alkylene, oxy- and N-alkylamino-alkylene group having from about 3 to about 16 methylene groups.

3. A tire having decreased rolling resistance and having at least one structural element selected from the group consisting of treads, subtreads, black sidewalls, body ply skims and bead fillers, wherein said structural element is formed from the rubber composition as set forth in claim 2.

4. A structural element of a tire formed from a rubber composition;

wherein the structural element is selected from the group consisting of treads, subtreads, black sidewalls, body ply skims and bead fillers;

wherein said rubber composition is formed by compounding a polymer with from about 5 to about 80 parts by weights of carbon black, per 100 parts by weight of said polymer;

wherein said polymer is formed by forming a solution of one or more anionically polymerizable monomers, selected from the group consisting of conjugated dienes having from about 4 to about 12 carbon atoms, monovinyl aromatic monomers having 8 to 18 carbon atoms, trienes and mixtures thereof, in a hydrocarbon solvent; and, polymerizing said monomers with a mixture of a lithio amine, from about 0.01 to about 2 equivalents per equivalent of lithium of a chelating agent, and an organic alkali metal compound selected from the group consisting of compounds having the formula $R_4OM$, $R_5C(O)OM$, $R_6R_7NM$, and $R_8SO_3M$, where $R_4$, $R_5$, $R_6$ $R_7$, and $R_8$ are each selected from the group consisting of alkyls, cycloalkyls, alkenyls, aryls, and phenyls, having from 1 to about 12 carbon atoms; and where M is selected from the group consisting of Na, K, Rb and Cs, to form said polymer;

said lithio amine having the formula (A)Li(SOL)y where y is from about 0.5 to about 3; SOL is a solubilizing component selected from the group consisting of hydrocarbons, ethers, amines and mixtures thereof; and, A is selected from the group consisting of alkyl, dialkyl, cycloalkyl and dicycloalkyl amine radicals having the formula

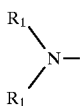

and cyclic amine radicals having the formula

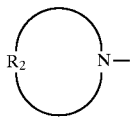

where each $R_1$ is independently selected from the group consisting of alkyls, cycloalkyls and aralkyls having from 1 to about 12 carbon atoms, and $R_2$ is selected from the group consisting of divalent alkylene, bicycloalkane, substituted alkylene, oxy- and N-alkylamino-alkylene group having from about 3 to about 16 methylene groups.

5. A polymer prepared by forming a solution of one or more anionically polymerizable monomers, selected from the group consisting of conjugated dienes having from about 4 to about 12 carbon atoms, monovinyl aromatic monomers having 8 to 18 carbon atoms, trienes and mixtures thereof, in a hydrocarbon solvent; and,
  polymerizing said monomers with a mixture of a lithio amine, from about 0.01 to about 2 equivalents per equivalent of lithium of a chelating agent, and an organic alkali metal compound selected from the group consisting of compounds having the formula $R_4OM$, $R_5C(O)OM$, $R_6R_7NM$, and $R_8SO_3M$, where $R_4$, $R_5$, $R_6$ $R_7$, and $R_8$ are each selected from the group consisting of alkyls, cycloalkyls, alkenyls, aryls, and phenyls, having from 1 to about 12 carbon atoms; and where M is selected from the group consisting of Na, K, Rb and Cs, to form the polymer;
  said lithio amine having the formula (A) Li (SOL)y where y is from about 0.5 to about 3; SOL is a solubilizing component selected from the group consisting of hydrocarbons, ethers, amines and mixtures thereof; and, A is selected from the group consisting of alkyl, dialkyl, cycloalkyl and dicycloalkyl amine radicals having the formula

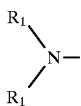

and cyclic amine radicals having the formula

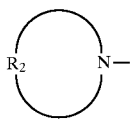

where each $R_1$ is independently selected from the group consisting of alkyls, cycloalkyls and aralkyls having from 1 to about 12 carbon atoms, and $R_2$ is selected from the group consisting of divalent alkylene, bicycloalkane, substituted alkylene, oxy- and N-alkylamino-alkylene group having from about 3 to about 16 methylene groups.

6. A polymer, as set forth in claim 1, wherein the chelating agent is selected from the group consisting of tetramethylethylenediamine, oxolanyl cyclic acetals, and cyclic oligomeric oxolanyl alkanes.

7. A rubber composition, as set forth in claim 2, wherein the chelating agent is selected from the group consisting of tetramethylethylenediamine, oxolanyl cyclic acetals, and cyclic oligomeric oxolanyl alkanes.

8. A structural element of a tire, as set forth in claim 4, wherein the chelating agent is selected from the group consisting of tetramethylethylenediamine, oxolanyl cyclic acetals, and cyclic oligomeric oxolanyl alkanes.

9. A polymer, as set forth in claim 5, wherein the chelating agent is selected from the group consisting of tetramethylethylenediamine, oxolanyl cyclic acetals, and cyclic oligomeric oxolanyl alkanes.

10. A polymer, as set forth in claim 5, wherein SOL is selected from the group consisting of tetrahydrofuran and tetramethylethylenediamine.

11. A polymer, as set forth in claim 5, wherein the chelating agent is employed in an amount from about 0.02 to about 0.1 equivalents per equivalent of lithium.

12. A polymer, as set forth in claim 1, where A is a cyclic amine radical having the formula

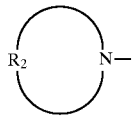

where $R_2$ is selected from the group consisting of divalent alkylene, bicycloalkane, substituted alkylene, oxy- and N-alkylamino-alkylene group having from about 3 to about 16 methylene groups.

13. A rubber composition, as set forth in claim 2, where A is a cyclic amine radical having the formula

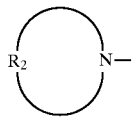

where $R_2$ is selected from the group consisting of divalent alkylene, bicycloalkane, substituted alkylene, oxy- and N-alkylamino-alkylene group having from about 3 to about 16 methylene groups.

14. A structural element of a tire, as set forth in claim 4, where A is a cyclic amine radical having the formula

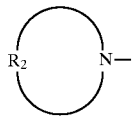

where $R_2$ is selected from the group consisting of divalent alkylene, bicycloalkane, substituted alkylene, oxy- and N-alkylamino-alkylene group having from about 3 to about 16 methylene groups.

15. A polymer, as set forth in claim 5, where A is a cyclic amine radical having the formula

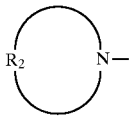

where $R_2$ is selected from the group consisting of divalent alkylene, bicycloalkane, substituted alkylene, oxy- and N-alkylamino-alkylene group having from about 3 to about 16 methylene groups.

16. A polymer, as set forth in claim 5, where Y is about 2.

17. A polymer, as set forth in claim 1, wherein the lithio amine that is defined by the formula (A)Li(SOL)y is formed by mixing an organolithium and an amine in the presence of the anionically polymerizable monomers.

18. A rubber composition, as set forth in claim 2, wherein the lithio amine that is defined by the formula (A)Li(SOL)y is formed by mixing an organolithium and an amine in the presence of the anionically polymerizable monomers.

19. A structural element of a tire, as set forth in claim 4, wherein the lithio amine that is defined by the formula (A)Li(SOL)y is formed by mixing an organolithium and an amine in the presence of the anionically polymerizable monomers.

20. A polymer, as set forth in claim 5, wherein the lithio amine that is defined by the formula (A)Li(SOL)y is formed by mixing an organolithium and an amine in the presence of the anionically polymerizable monomers.

21. A polymer, as set forth in claim 1, wherein SOL is selected from the group including dienyl or vinyl aromatic polymers or copolymers having a degree of polymerization of from 3 to about 300 polymerization units.

22. A rubber composition, as set forth in claim 2, wherein SOL is selected from the group including dienyl or vinyl aromatic polymers or copolymers having a degree of polymerization of from 3 to about 300 polymerization units.

23. A structural element of a tire, as set forth in claim 4, wherein SOL is selected from the group including dienyl or vinyl aromatic polymers or copolymers having a degree of polymerization of from 3 to about 300 polymerization units.

24. A polymer, as set forth in claim 5, wherein SOL is selected from the group including dienyl or vinyl aromatic polymers or copolymers having a degree of polymerization of from 3 to about 300 polymerization units.

* * * * *